United States Patent
Dai et al.

(10) Patent No.: US 10,014,782 B2
(45) Date of Patent: Jul. 3, 2018

(54) DC/DC CONVERSION APPARATUS

(71) Applicant: Murata Manufacturing Co., Ltd., Nagaokakyo-shi, Kyoto-fu (JP)

(72) Inventors: Jiale Dai, Shanghai (CN); Yu Cao, Shanghai (CN); Kezhi Wang, Shangai (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/279,748

(22) Filed: Sep. 29, 2016

(65) Prior Publication Data

US 2017/0093294 A1    Mar. 30, 2017

(30) Foreign Application Priority Data

Sep. 30, 2015  (CN) .......................... 2015 1 0640591

(51) Int. Cl.
  *H02M 3/337*   (2006.01)
  *H02M 3/335*   (2006.01)
  (Continued)

(52) U.S. Cl.
  CPC ..... *H02M 3/33507* (2013.01); *H02M 3/3376* (2013.01); *H02M 1/15* (2013.01);
  (Continued)

(58) Field of Classification Search
  CPC . H02M 2007/4818; H02M 2007/4815; H02M 3/33538; H02M 3/33546;
  (Continued)

(56) References Cited

U.S. PATENT DOCUMENTS

2012/0229034 A1  9/2012  Yu et al.
2012/0300502 A1  11/2012  Shimada et al.
2013/0099787 A1*  4/2013  Lu ....................... H02M 3/3376
                                                                  324/319

FOREIGN PATENT DOCUMENTS

CN    103138581 A    6/2013
JP    2003-324956 A    11/2003
(Continued)

OTHER PUBLICATIONS

Official Communication issued in Japanese Patent Application No. 2016-191335, dated Aug. 29, 2017.

*Primary Examiner* — Timothy J Dole
*Assistant Examiner* — Bryan R Perez
(74) *Attorney, Agent, or Firm* — Keating & Bennett, LLP

(57) ABSTRACT

A DC/DC conversion apparatus includes a DC voltage source, an oscillation circuit being electrically connected to the DC voltage source, a plurality of switch elements, a switch controller, which closes or opens electrical connection between the DC voltage source and the oscillation circuit by switching turn-on and turn-off of the plurality of switch elements, and switches a direction of a voltage applied on the oscillation circuit between a first direction and a second direction, a transformation circuit, a detector to detect one or more parameter values of an input voltage and input current of the DC voltage source and an output voltage and output current to the transformation circuit, wherein when the parameter values vary, the switch controller adjusts a length of time in which the voltage applied on the oscillation circuit is in one of the first direction and the second direction, such that the output voltage and/or output current returns to an initial value.

15 Claims, 5 Drawing Sheets

(51) Int. Cl.
*H02M 1/15* (2006.01)
*H02M 1/00* (2006.01)

(52) U.S. Cl.
CPC .... *H02M 3/337* (2013.01); *H02M 2001/0058* (2013.01); *Y02B 70/1491* (2013.01)

(58) Field of Classification Search
CPC ......... H02M 3/33515; H02M 3/33576; H02M 3/33553; H02M 3/33507; H02M 3/33592; H02M 3/33523; H02M 3/3376; H02M 1/15; Y02B 70/1491
USPC ................... 363/15–19, 21.02, 21.03, 97–98
See application file for complete search history.

(56) References Cited

FOREIGN PATENT DOCUMENTS

| | | |
|---|---|---|
| JP | 2012-249375 A | 12/2012 |
| JP | 2013-243804 A | 12/2013 |
| TW | 201238221 A1 | 9/2012 |

\* cited by examiner

DC/DC CONVERSION APPARATUS

CROSS REFERENCE TO RELATED APPLICATIONS

This application claims the benefit of priority to Chinese Patent Application No. 201510640591.3 filed Sep. 30, 2015. The entire contents of this application is hereby incorporated herein by reference.

BACKGROUND OF THE INVENTION

1. Field of the Invention

The present invention relates to a DC/DC conversion apparatus that includes a LLC full-bridge circuit.

2. Description of the Related Art

In the prior art, a switch power supply is one power supply that utilizes a modern power electronic technology to control a ratio of a turn-on time and a turn-off time of a switch and maintain a stable output voltage, in which a DC/DC conversion apparatus, i.e., direct current-direct current conversion circuit, is a voltage transformer that effectively converts a DC input voltage into a fixed DC output voltage. Generally, the DC/DC conversion apparatus is divided into three types: a boost DC/DC transformer, a buck DC/DC transformer, and a boost-buck DC/DC transformer, and three types of control may be utilized according to the requirements. Specifically, by utilizing energy storage characteristics of a capacitor and an inductor, high-frequency switching actions is performed by a controllable switch (MOSFET, etc.), inputted electric energy is stored in the capacitor or the inductor, and the electric energy is released to a load so as to provide energy when the switch is turned off. The ability to output power or a voltage is related to a duty cycle, i.e., a ratio of a turn-on time of the switch and the whole cycle of the switch.

However, as the power electronic technology is developing rapidly, requirements, such as more high-frequency operation, high conversion efficiency, high power density, low noise, and other requirements have been proposed to a switch power supply.

FIG. 6 shows an existing DC/DC conversion apparatus 100 that includes a LLC full-bridge circuit. As shown in FIG. 6, the DC/DC conversion apparatus 100 includes a direct-current (DC) voltage source V10, four switch elements Q1~Q4, an oscillation circuit 20 including an inductor Lr and a capacitor Cr, and a transformation circuit 40 including a transformer 30 and a rectification circuit. In the DC/DC conversion apparatus 100, turn-on and turn-off of individual switch elements Q1~Q4 are controlled, so as to control energy to be transmitted from a primary side Tr1 of the transformer 30 to its secondary side Tr2.

CN patent CN201110394250.4 provides a DC/DC converter, power transformer, and control methods thereof. It has been broadly mentioned in CN201110394250.4 that asymmetry of a ratio of times in two directions of a power supply voltage being loaded on a LLC resonance loop is changed, so as to change a gain. However, the gain varies due to many factors, such as a variation of the load in a curve that shows the above asymmetry varies, which is not a static period. Parameters involved in changing the gain in the above manner are numerous, and control of the parameters is quite complicated.

For the individual switch elements Q1~Q4 in the DC/DC conversion apparatus 100 as shown in FIG. 6, their control sequences are shown in FIG. 7.

As shown in FIG. 7, a duty cycle of each switch element Q1~Q4 is 50%. At time t0, the switch elements Q1 and Q4 are turned on, the switch elements Q2 and Q3 are turned off, and a voltage $Vc_{+-}$ applied on the oscillation circuit 20 including the inductor Lr and the capacitor Cr is a positive value. At this moment, a current $I_{LLC}$ flowing through the oscillation circuit 20 has a positive value and increases gradually. Then, at time t1, the switch elements Q2 and Q3 are turned on and the switch elements Q1 and Q4 are turned off. At this moment, since the voltage is varying intermittently, the voltage $Vc_{+-}$ applied on the oscillation circuit 20 instantly becomes a negative value. However, since the current is varying consecutively, as shown in FIG. 7, at time t1, when the voltage $Vc_{+-}$ applied on the oscillation circuit 20 instantly becomes a negative value, the current $I_{LLC}$ flowing through the oscillation circuit 20 is still a positive value although it decreases gradually. In other words, from time t1 (i.e., a time of switching the switches) to the time of the current $I_{LLC}$ flowing through the oscillation circuit 20 being reduced to zero, the current $I_{LLC}$ flowing through the oscillation circuit 20 has a opposite direction from the voltage $Vc_{+-}$ applied on two terminals of the oscillation circuit 20. The result is that, since energy to be outputted to the secondary side Tr2 of the transformer 30 is a product of the voltage $Vc_{+-}$ and the current $I_{LLC}$, as shown in FIG. 7, the energy to be outputted to the secondary side of the transformer 30 is negative (i.e., the energy flows reversely from the oscillation circuit 20 to the DC voltage source V10) within a time period of A→B, and the energy will oscillate between the DC voltage source V10 and the oscillation circuit 20 after the time period of A→B. The oscillation between the DC voltage source V1 and the oscillation circuit 20 and a resistance present on a current path of the oscillation circuit 20 will result in an unnecessary loss.

Likewise, at time t2, the switch elements Q1 and Q4 are turned on and the switch elements Q2 and Q3 are turned off. At this moment, since the voltage is varying intermittently, the voltage $Vc_{+-}$ applied on the oscillation circuit 20 instantly becomes a positive value. However, since the current is varying consecutively, as shown in FIG. 7, at time t2, when the voltage $Vc_{+-}$ applied on the oscillation circuit 20 instantly becomes a positive value, the current $I_{LLC}$ flowing through the oscillation circuit 20 is still a negative value although it increases gradually. The result is that, as shown in FIG. 7, the energy to be outputted to the secondary side Tr2 of the transformer 30 is negative (i.e., the energy flows reversely from the oscillation circuit 20 to the DC voltage source V10) and oscillates between the DC voltage source V10 and the oscillation circuit 20 within a time period of C→D. A resistance present on the current path of the oscillation circuit 20 will result in an unnecessary loss.

In addition, a gain perspective should also be considered. Assume that a gain of the DC/DC conversion apparatus 100 is 1, switching frequencies of the individual switch elements Q1~Q4 in the DC/DC conversion apparatus 100 are equal to a resonance frequency of the oscillation circuit 20. At this moment, a loss will not be generated in the DC/DC conversion apparatus 100. However, if the gain is less than 1, an input voltage Vin is certainly greater than an output voltage Vout. Since the duty cycles of the switch elements Q1~Q4 are 50%, $I_{LLC}$=Iout (i.e., the current $I_{LLC}$ flowing through the oscillation circuit 20 is equal to an output current) and input energy (i.e., a product of Vin and $I_{LLC}$) is certainly greater than output energy (i.e., a product of Vout and Iout). Wherein this extra portion (i.e., a value of Vin*$I_{LLC}$−Vout*Iout) has been consumed in the DC/DC conversion apparatus 100.

In other words, in the existing DC/DC conversion apparatus 100 as shown in FIG. 6, turn-on and turn-off of the individual switch elements Q1~Q4 are controlled by the duty cycle 50% such that a portion of the energy will be consumed at the primary Tr1 of the transformer 30, which results in a reduced output power such that the gain of the DC/DC conversion apparatus 100 also decreases.

On the other hand, in the DC/DC conversion apparatus that employs a LLC full-bridge circuit, there is also a problem of a loss of a switch (i.e., MOSFET, etc.). For the problem of the switching loss, a soft-switching technology is usually utilized in the present technical field.

Soft-switching is in contrast to hard-switching. Generally, resonance is introduced before and after the process of the turn-on and the turn-off, such that a voltage of the switch before it is turned on is firstly reduced to zero and a current of the switch before it is turned off is firstly reduced to zero, which can eliminate an overlap of the voltage and the current of the switch during the turn-on and the turn-off and decrease their variation ratio so as to greatly reduce or even eliminate the switching loss. At the same time, a variation ratio of a voltage and a current of the switch during the turn-on and the turn-off is restricted by the resonance process, which also significantly decreases the noise of the switch.

For the process of turning off the switch, an ideal soft turn-off process is such that the current is firstly reduced to zero and then the voltage increases slowly to an off-state value. At this moment, a turn-off loss of the switch is approximately zero. Since the current of the device before it is turned off has been reduced to zero, the problem of inductive turn-off has been solved. This is usually referred to as a zero current switch (ZCS). In addition, for the process of turning on the switch, an ideal soft turn-on process is such that the voltage is firstly reduced to zero and then the current increases slowly to an on-state value. At this moment, turn-on loss of the switch is approximately zero. Since the voltage of a junction capacitance of the device is also zero, the problem of capacitive turn-on has been solved. This is usually referred to as a zero voltage switch (ZVS).

In the prior art, in order to decrease the loss of the switch when it is turned on or even achieve the zero current switch (ZCS) and/or the zero voltage switch (ZVS), sequences of turning on and turning off the individual switch elements Q1~Q4 have to be adjusted appropriately.

In the DC/DC conversion apparatus 100 as shown in FIG. 6, when the individual switch elements Q1~Q4 are controlled by control sequences as shown in FIG. 7, the switch elements Q2 and Q3 are turned on at time t1. At this moment, since the DC power supply voltage Vin of the DC voltage source V10 is directly applied at two terminals of the switch elements Q3 and Q2, for the switch elements Q2 and Q3, it is difficult to achieve the zero voltage switch (ZVS), and vice versa. At time t2, the switch elements Q1 and Q4 are turned on. At this moment, since the DC power supply voltage Vin of the DC voltage source V10 is directly applied at two terminals of the switch elements Q1 and Q4, for the switch elements Q1 and Q4, it is also difficult to achieve the zero voltage switch (ZVS).

FIG. 8 shows a relationship between a switching frequency (fs, horizontal axis) and a gain (vertical axis). When the output voltage is constant but the load becomes smaller, its output current will become smaller and, thus, the gain will decrease. When the switching frequency is greater than a resonance frequency, the gain may decrease by controlling the switching frequency to increase.

However, in the DC/DC conversion apparatus 100 as shown in FIG. 6, when the load becomes lighter, increasing the switching frequency of the switch will result in an increased switching loss.

SUMMARY OF THE INVENTION

Preferred embodiments of the present invention provide a DC/DC conversion apparatus, in which when an output voltage and/or an output current varies, a gain may be adjusted such that a switching frequency (length of a cycle) will not have a larger change.

A preferred embodiment of the present invention provides a DC/DC conversion apparatus, which quickly responds to changes of an output voltage and/or an output current and output a small ripple.

Another preferred embodiment of the present invention provides a DC/DC conversion apparatus, which adjusts a gain stably when a load is lighter and an output capacitance is small.

A DC/DC conversion apparatus according to a preferred embodiment of the present invention includes a DC voltage source that outputs a DC power supply voltage; an oscillation circuit electrically connected to the DC voltage source; a plurality of switch elements; a switch controller that closes or opens an electrical connection between the DC voltage source and the oscillation circuit and switches a direction of a voltage applied to the oscillation circuit between a first direction and a second direction by switching turn-on and turn-off of the plurality of switch elements; a transformation circuit that outputs a current generated in the oscillation circuit and converts the current into a DC current, and a detector that detects one or more parameter values of an input voltage and input current of the DC voltage source and an output voltage and output current on the transformation circuit, wherein when the parameter values vary, the switch controller adjusts a length of time in which the voltage applied on the oscillation circuit is in one of the first direction and the second direction, such that the output voltage and/or output current returns to an initial value.

In a DC/DC conversion apparatus according to a preferred embodiment of the present invention, the switch controller opens the electrical connection between the oscillation circuit and the DC voltage source before the direction of the voltage applied on the oscillation circuit is switched from the first direction to the second direction, then closes the electrical connection between the oscillation circuit and the DC voltage source, and switches the direction of the voltage applied on the oscillation circuit to the second direction; when the output voltage and/or output current on the transformation circuit vary, the switch controller adjusts a length of time in which the oscillation circuit is disconnected from the DC voltage source, such that the output voltage and/or output current returns to the initial value.

In a DC/DC conversion apparatus according to a preferred embodiment of the present invention, the switch controller opens the electrical connection between the oscillation circuit and the DC voltage source before the direction of the voltage applied on the oscillation circuit is switched from the first direction to the second direction, then closes the electrical connection between the oscillation circuit and the DC voltage source and switches the direction of the voltage applied on the oscillation circuit to the second direction after a current flowing through the oscillation circuit has been outputted to the transformation circuit and after a specified latency; when the output voltage and/or output current on the transformation circuit vary, the switch controller adjusts a length of the specified latency, such that the output voltage and/or output current returns to the initial value.

In a DC/DC conversion apparatus according to a preferred embodiment of the present invention, a length of time in which the oscillation circuit is in the first direction is greater than a length of time in which the oscillation circuit is in the second direction.

In a DC/DC conversion apparatus according to a preferred embodiment of the present invention, the switch controller adjusts the length of time in which the oscillation circuit is in the first direction.

In a DC/DC conversion apparatus according to a preferred embodiment of the present invention, during the voltage applied on the oscillation circuit being in the second direction, energy is inputted from the DC voltage source to the oscillation circuit, a length of time in which the voltage applied on the oscillation circuit is in the second direction is set such that energy obtained from the DC voltage source is greater than energy required to achieve a zero voltage switch (ZVS) when the oscillation circuit is switched to the first direction.

In a DC/DC conversion apparatus according to a preferred embodiment of the present invention, when a deviation of the output voltage and/or output current on the transformation circuit from the initial value is greater than a first threshold, the switch controller firstly adjusts a length of time in which the voltage applied on the oscillation circuit is in the first direction such that the output voltage and/or current changes to within one interval near a target voltage/current value, and then slightly adjusts the length of time in which the voltage applied on the oscillation circuit is in the first direction and a length of time in which the oscillation circuit is disconnected from the DC voltage source such that the output voltage and/or current returns to the initial value.

According to various preferred embodiments of the present invention, a stable adjustment in a wide range is obtained by adjusting a length of time of opening the electrical connection between the oscillation circuit and the DC voltage source and a length of time of applying a forward voltage or reverse voltage to the oscillation circuit.

Further, according to various preferred embodiments of the present invention, the gain is able to be adjusted such that a switching frequency of the converter will not have a larger change. While the gain varies, a variation ratio of the output energy is less and an output ripple is smaller.

Furthermore, according to various preferred embodiments of the present invention, a switching loss of the switch element when it is turned on is able to be reduced and furthermore the switch element is allowed to realize a zero voltage switch (ZVS).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A DC/DC conversion apparatus according to a first preferred embodiment of the present invention will be described below with reference to FIG. 1.

Figure 1:
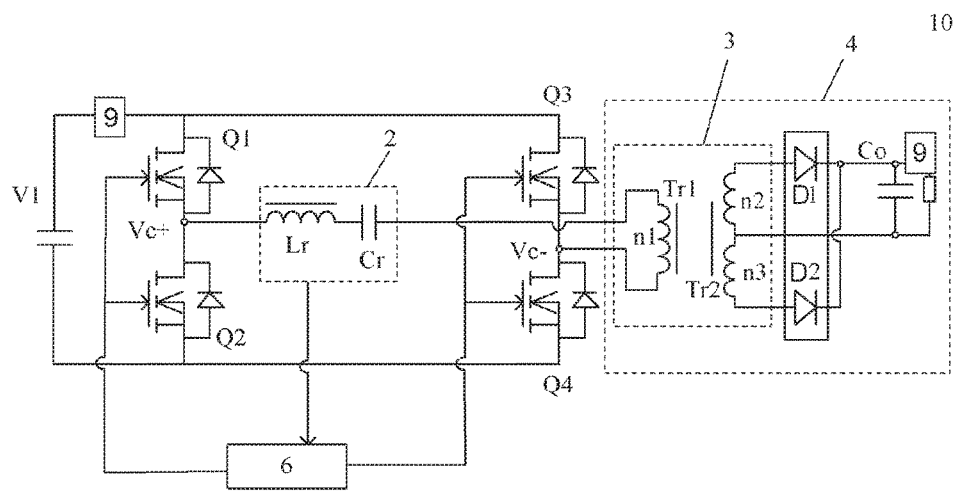
FIG. 1 is a block diagram illustrating a circuit structure of a DC/DC conversion apparatus 10 according to a first preferred embodiment of the present invention.

FIG. 1 is a block diagram illustrating a circuit structure of a DC/DC conversion apparatus 10 according to a first preferred embodiment of the present invention. As shown in FIG. 1, the DC/DC conversion apparatus 10 includes a DC voltage source V1 that outputs a DC power supply voltage Vin; an oscillation circuit 2 being electrically connected to the DC voltage source V1; a plurality of switch elements Q1~Q4; a switch controller 6, which closes or opens an electrical connection between the DC voltage source V1 and the oscillation circuit 2 by switching turn-on and turn-off of the plurality of switch elements Q1~Q4, and switches a direction of a voltage applied to the oscillation circuit 2 between a first direction and a second direction; a transformation circuit 4 that outputs a current generated in the oscillation circuit 2 and converts the current into a DC current; and a detector 9 that detects one or more parameter values of an input voltage and an input current of the DC voltage source and an output voltage and an output current on the transformation circuit.

Specifically, a positive side of the DC voltage source V1 is connected to drain sides of a switch element Q1 and a switch element Q3, and a negative side of the DC voltage source V1 is connected to source sides of a switch element Q2 and a switch element Q4. In preferred embodiments of the present invention, the DC voltage source V1 is an electronic apparatus that provides a stable DC power supply voltage Vin for a load. For example, the DC voltage source V1 may preferably be a dry battery, a storage battery, a DC generator, or other suitable voltage source.

A transformer 3, rectification diodes D1 and D2, and an output capacitor Co are provided in the transformation circuit 4. The transformer 3 includes a primary side Tr1 and a secondary side Tr2, in which the primary side Tr1 includes a coil n1 and the secondary side Tr2 includes a coil n2 and a coil n3. An anode of the rectification diode D1 is connected at one terminal of the coil n3 of the secondary side Tr2 and a cathode of the rectification diode D1 is connected to the other terminal of the coil n3 of the secondary side Tr2 via the output capacitor Co. In addition, an anode of the rectification diode D2 is connected to one terminal of the coil n2 of the secondary side Tr2 and a cathode of the rectification diode D2 is connected to the cathode of the rectification diode D1.

An inductor Lr and a capacitor Cr are provided in the oscillation circuit 2, and a high potential side terminal Vc+ and a low potential side terminal Vc− are provided in the oscillation circuit 2. The primary side Tr1 of the transformer 3 is connected in series with the oscillation circuit 2. The high potential side terminal Vc+ is connected to a connection point of the switch element Q1 and the switch element Q2 and the low potential side terminal Vc− is connected to a connection point of the switch element Q3 and the switch element Q4. The inductor Lr and the capacitor Cr are connected in series between the high potential side terminal Vc+ and the low potential side terminal Vc− via the primary side Tr1 of the transformer 3.

Connection relationships of the plurality of switch elements Q1~Q4 are shown in FIG. 1. The first switch element Q1 is provided between the positive side of the DC voltage source V1 and the high potential side terminal Vc+ of the oscillation circuit 2, the third switch element Q3 is provided between the positive side of the DC voltage source V1 and the low potential side terminal Vc− of the oscillation circuit 2, the second switch element Q2 is provided between the negative side of the DC voltage source V1 and the high potential side terminal Vc+ of the oscillation circuit 2, and the fourth switch element Q4 is provided between the negative side of the DC voltage source V1 and the low potential side terminal Vc− of the oscillation circuit 2.

In addition, the plurality of switch elements Q1~Q4 may preferably be a field-effect transistor that is widely used in an analog circuit and a digital circuit, e.g., a metal oxide semiconductor field-effect transistor (MOSFET). The MOSFET may be divided into two types: "N-type" and "P-type" according to different polarities of its operating carriers, usually called NMOSFET and PMOSFET. In preferred embodiments of the present invention, there is no specific restriction on the plurality of switch elements Q1~Q4, which may be an "N-type" MOSFET and which may be a "P-type" MOSFET.

The switch controller 6 switches turn-on and turn-off of the plurality of switch elements Q1~Q4 according to an inputted current $I_{LLC}$ as described above. Specifically, when the switch element Q1 and the switch element Q4 are turned on and the switch element Q2 and the switch element Q3 are turned off under the control of the switch controller 6, a voltage Vc+− applied to two terminals of the oscillation circuit 2 has the same direction as the DC power supply voltage Vin, i.e., forward voltages will be applied thereon. When the switch element Q2 and the switch element Q3 are turned on and the switch element Q1 and the switch element Q4 are turned off under the control of the switch controller 6, a voltage Vc+− applied to two terminals of the oscillation circuit 2 has an opposite direction from the DC power supply voltage Vin, i.e., reverse voltages will be applied thereon. In addition, when the switch element Q1 and the switch element Q3 are both turned off or when the switch element Q2 and the switch element Q4 are both turned off, the oscillation circuit 2 is not electrically connected to the DC voltage source V1, i.e., no voltage will be applied to two terminals of the oscillation circuit 2.

Figure 4:
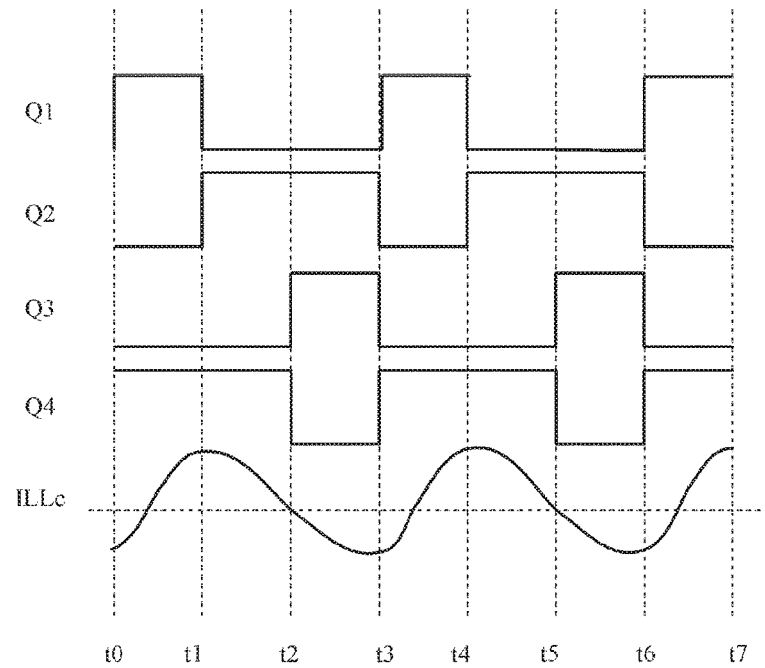
FIG. 4 shows a timing diagram of turn-on/turn-off of individual switch elements Q1~Q4 under control of a switch controller 6.

FIG. 4 shows a timing diagram of turn-on/turn-off of individual switch elements Q1~Q4 under the control of the switch controller 6.

As shown in FIG. 4, time t0 to time t3 is one cycle.

At time t0, the switch element Q1 and the switch element Q4 are turned on at the same time and the switch element Q2 and the switch element Q3 are turned off at the same time under the control of the switch controller 6. Thus, the electrical connection between the oscillation circuit 2 and the DC voltage source V1 is closed and the voltage Vc+− applied on the oscillation circuit 2 instantly becomes a positive value. At this moment, since a forward voltage Vc+− has been applied to the oscillation circuit 2, a current $I_{LLC}$ flowing through the oscillation circuit 2 becomes a positive value and increases gradually.

At time t1, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is opened, the voltage Vc+− applied on the oscillation circuit 2 instantly becomes zero, but the current $I_{LLC}$ flowing through the oscillation circuit 2 is still a positive value. At this moment, since the switch element Q2 and the switch element Q4, the inductor Lr, the capacitor Cr, and the primary side Tr1 of the transformer 3 define a resonance loop, the current $I_{LLC}$ oscillates freely in the resonance loop while the capacitor Cr is charged, and energy continues to be transmitted from the inductor Lr to the primary side Tr1 of the transformer 3 such that the energy is transmitted to the secondary side Tr2 via the primary side Tr1 of the transformer 3 until the current $I_{LLC}$ flowing through the oscillation circuit 2 becomes zero.

At time t2, the current $I_{LLC}$ flowing through the oscillation circuit 2 becomes zero. At this moment, the switch element Q2 and the switch element Q3 are turned on at the same time and the switch element Q1 and the switch element Q4 are turned off at the same time under the control of the switch controller 6. Thus, the electrical connection between the oscillation circuit 2 and the DC voltage source V1 is closed and the voltage Vc+− applied on the oscillation circuit 2 instantly becomes a negative value. At this moment, since a negative voltage Vc+− has been applied on the oscillation circuit 2, the current $I_{LLC}$ flowing through the oscillation circuit 2 decreases negatively from zero, i.e., becomes a negative value.

As described above, at time t2, since the current $I_{LLC}$ flowing through the oscillation circuit 2 becomes zero, no energy will be transmitted from the oscillation circuit 2 to the secondary side Tr2 via the primary side Tr1 of the transformer 3 at this moment. Thus, at time t2, no energy will flow reversely from the oscillation circuit 2 to the DC voltage source V1.

At time t3, the switch element Q1 and the switch element Q4 are turned on at the same time and the switch element Q2 and the switch element Q3 are turned off at the same time under the control of the switch controller 6. Thus, the electrical connection between the oscillation circuit 2 and the DC voltage source V1 is closed and the voltage Vc+− applied on the oscillation circuit 2 instantly becomes a positive value from the negative value. At this moment, similar the above time t0, since a forward voltage Vc+− has been applied on the oscillation circuit 2, the current $I_{LLC}$ flowing through the oscillation circuit 2 is forced to become a positive value from the negative value and increases gradually.

As described above, a condition in which "the current $I_{LLC}$ flowing through the oscillation circuit 2 becomes zero" has been described in the first preferred embodiment. However, in the present technical field, depending on whether a parasitic inductance Lm on the primary Tr1 of the transformer 3 is being considered, the conditions in which "the current $I_{LLC}$ flowing through the oscillation circuit 2 becomes zero" will be different.

Figure 2:
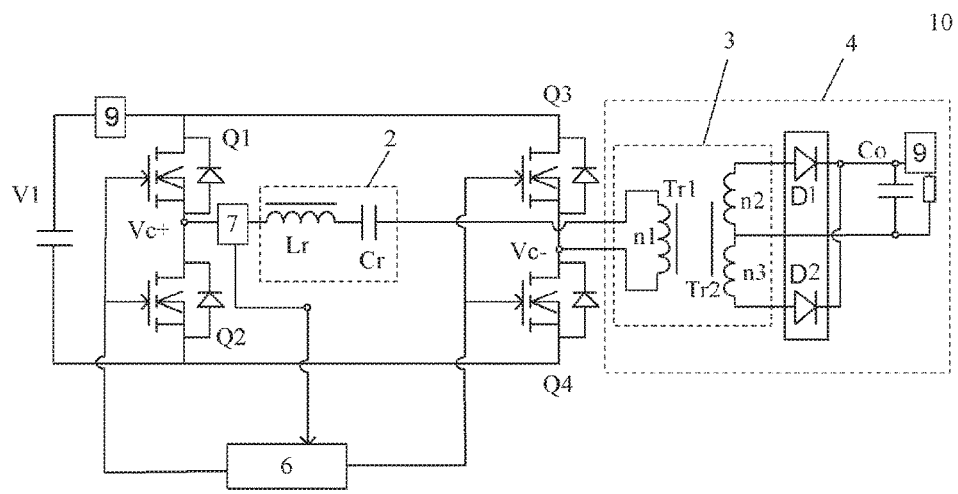
FIG. 2 is a block diagram illustrating a circuit structure of a DC/DC conversion apparatus 10 according to a first variation of a first preferred embodiment of the present invention.

FIG. 2 is a block diagram illustrating a circuit structure of a DC/DC conversion apparatus according to a first variation of the first preferred embodiment of the present invention.

When the parasitic inductance Lm on the primary side Tr1 of the transformer 3 connected to the oscillation circuit 2 is very small, a current ILm flowing through the parasitic inductance may be ignored. At this moment, "the current $I_{LLC}$ flowing through the oscillation circuit 2" is equal or substantially equal to the current ILr flowing through the inductor Lr. Moreover, as shown in FIG. 2, a first detector 7 is provided on the inductor Lr, and the current Lr flowing through the inductor Lr is detected by the first detector 7. In this case, when the current detected by the first detector 7 is equal or substantially equal to zero (i.e., ILr=0), turn-on or turn-off of the switch elements Q1~Q4 is switched by the switch controller 6 such that a direction of the voltage applied on the oscillation circuit 2 is inverted.

In other words, when the parasitic inductance Lm on the primary side Tr1 of the transformer 3 is not considered, "the current $I_{LLC}$ flowing through the oscillation circuit 2 becomes zero" means that the current ILr flowing through the inductor Lr becomes zero.

Figure 3:
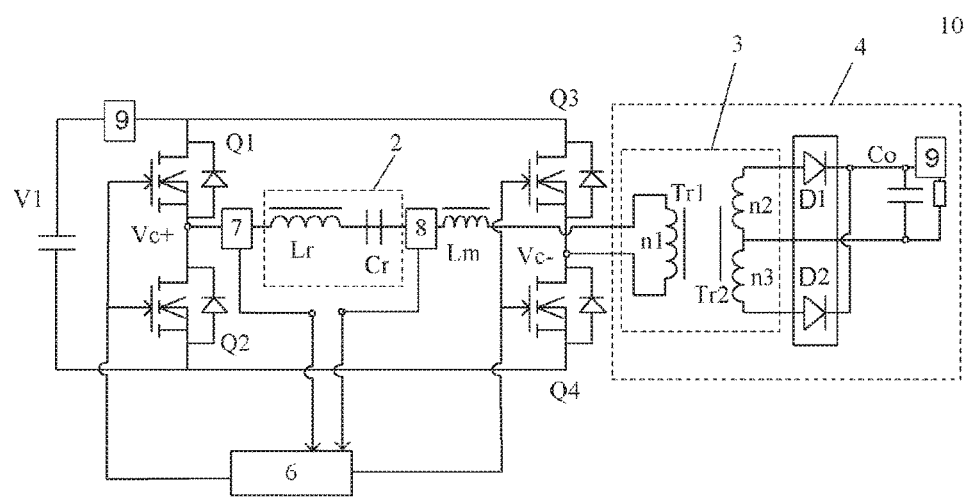
FIG. 3 is a block diagram illustrating a circuit structure of a DC/DC conversion apparatus 10 according to a second variation of a first preferred embodiment of the present invention.

FIG. 3 is a block diagram illustrating a circuit structure of a DC/DC conversion apparatus according to a second variation of the first preferred embodiment of the present invention.

When the parasitic inductance Lm on the primary side Tr1 of the transformer 3 connected to the oscillation circuit 2 is relatively large, the current ILm flowing through the parasitic inductance cannot be ignored. At this moment, "the current $I_{LLC}$ flowing through the oscillation circuit 2" is equal or substantially equal to a difference of the current ILr flowing through the inductor Lr and the current ILm flowing through the parasitic inductance Lm, i.e., ILr-ILm. Moreover, as shown in FIG. 3, a first detector 7 is provided on the inductor Lr and a second detector 8 is provided on the primary side Tr1 of the transformer 3. The current ILr flowing through the inductor Lr is detected by the first detector 7 while the current ILm flowing through the parasitic inductance Lm is detected by the second detector 8. In this case, when the difference between the current detected by the first detector 7 and the current detected by the second detector 8 is equal or substantially equal to zero (i.e., ILr−ILm=0), turn-on or turn-off of the switch elements Q1~Q4 is switched by the switch controller 6, such that the direction of the voltage applied on the oscillation circuit 2 is inverted.

In other words, when the parasitic inductance Lm on the primary side Tr1 of the transformer 3 is considered, "the current $I_{LLC}$ flowing through the oscillation circuit 2 becomes zero" means that the difference between the current ILr flowing through the inductor Lr and the current ILm flowing through the parasitic inductance Lm becomes zero.

In the DC/DC conversion apparatus, when the load becomes lighter, a gain of the conversion apparatus may be decreased by the following operations: the switch element Q1 and the switch element Q4 are turned on and the switch element Q2 and the switch element Q3 are turned off by the switch controller 6, the voltage applied on the oscillation circuit being a forward voltage at this moment; the electrical connection between the oscillation circuit and the DC voltage source is opened for a certain time; the switch element Q2 and the switch element Q3 are turned on and the switch element Q1 and the switch element Q4 are turned off, the voltage applied on the oscillation circuit being a reverse voltage. On the one hand, since the connection between the resonance circuit and the source is opened within a certain time, the total output energy is reduced so as to, in turn, achieve the result of decreasing the gain without increasing a switching frequency. Or, since the output voltage is fixed, the output current may decrease when the gain decreases so as to accommodate the case of a light load.

However, during switching of an input voltage of the resonance circuit from one direction to another direction, it can only be disconnected for a relative short time period, which cannot be extended indefinitely. When the load varies continuously, the switch control mode may not be further adjusted, thus having a certain limitation.

On the other hand, in such a switch control mode, since the connection between the resonance circuit and the source is opened within a certain time, energy within the resonance capacitor Cr is not effected by a reverse voltage, and a time of charging the oscillation capacitor Cr will increase, which results in an increased gain in some cases.

Briefly, the gain is adjusted only by adding a time period of opening during switching of the input voltage of the resonance circuit from one direction to another direction, which cannot obtain desired effects.

Therefore, in order for the gain of the DC/DC conversion apparatus to be adjusted in a wider range while a more stable output of the DC/DC conversion apparatus is obtained, a preferred embodiment of the present invention obtains stable adjustment of a wide range by adjusting a length of time of opening the electrical connection between the oscillation circuit and the DC voltage source and a length of time of applying a forward voltage or a reverse voltage to the oscillation circuit.

In the present preferred embodiment, when the detector detects a variation of an input voltage, an input current, an output voltage, or an output current of the DC/DC conversion apparatus, the gain is adjusted by the switch controller 6 such that the time of applying a forward voltage to the oscillation circuit 2 is different from the time of applying a reverse voltage to the oscillation circuit 2 (which is referred to as an asymmetric operation mode). An operating principle and operation modes of the DC/DC conversion apparatus will be described in details below.

A switch connection in which the switch element Q1 and the switch element Q4 are turned on at the same time and the switch element Q2 and the switch element Q3 are turned off at the same time is referred to as a first bridge arm. Similarly, a switch connection in which the switch element Q1 and the switch element Q4 are turned off at the same time and the switch element Q2 and the switch element Q3 are turned on at the same time is referred to as a second bridge arm.

In the present preferred embodiment, when the gain of the DC/DC conversion apparatus is adjusted, a turn-on time of the first bridge arm is assumed to be longer than a turn-on time of the second bridge arm, and thus, the first bridge arm is referred to as a long-time bridge arm and the second bridge arm is referred to as a short-time bridge arm. Of course, the principle that the second bridge arm is set as a long-time bridge arm and the first bridge arm is set as a short-time bridge arm is the same as the above, and thus, will not be described in details.

The two bridge arms will be analyzed independently below. Due to an asymmetric operation, a DC voltage Vcr_dc will necessarily appear on the resonance capacitor Cr, and the voltage Vcr_dc and the input voltage Vin are opposite on the long-time bridge arm. In comparison with a symmetric operation status in which turn-on times of the two bridge arms are equal, the input voltage of the DC/DC conversion apparatus is equivalent to Vin-Vcr_dc, i.e., the input voltage decreases. For the short-time bridge arm, the input voltage of the DC/DC conversion apparatus is Vin+Vcr_dc, which means the input voltage increases.

On the one hand, when the short-time bridge arm is turned on, a voltage applied on a resonance network Lr-Cr is Vin+Vcr_dc−n*Vout and a current of Lr increases. Next, the switches Q2 and Q4 are turned on and the switches Q1 and Q3 are turned off, the voltage applied on the resonance network is −Vcr_dc+n*Vout. As the voltage Vcr_dc increases, a rising slope of the current increases, but a falling slope of the current decreases. The current changing from zero to a maximum and then from the maximum to zero is regarded as one cycle, which means that a duty cycle of the input current and the output current decreases. In other words, if a peak of the current is invariable, the gain will decrease. At the same time, if a pulse width of the short-time bridge arm when it is turned on is invariable, since the voltage Vcr_dc increases, inputted energy will increase, which achieves the aim of increasing the gain.

On the other hand, the long-time bridge arm is firstly turned on, then the switches Q2 and Q4 are turned on and the switches Q1 and Q3 are turned off, and after the current $I_{LLC}$ flowing through the oscillation circuit 2 becomes zero, the short-time bridge arm will be turned on, such that the two bridge arms are asymmetric. In contrast to the short-time bridge, a time of the long-time bridge arm returning to zero decreases, which achieves the objective of increasing the gain. In the case in which the pulse width is invariable, the inputted energy is reduced, which achieves the objective of decreasing the gain. Thus, when the asymmetric operation mode is utilized, different variations of the gain will be obtained by different asymmetric control methods. If the turn-on times of the two bridge arms are adjusted at the same time, parameters required to be considered are very numerous, which causes the adjusting process to be too complicated, and the variation of the gain fluctuates too largely, which causes the output ripple to be larger.

In the present preferred embodiment, the turn-on time of the second bridge arm is preferably set as a fixed time period and the effects of fast response to a variation of load and a stable output are realized only by adjusting the turn-on time of the first bridge arm and the time of opening the electrical connection between the oscillation circuit and the DC voltage source.

When the detector detects the variation of the input voltage or input current, by varying the turn-on time of the first bridge arm and at the same time setting the turn-on time of the second bridge arm to be a fixed time period, the variation of the gain accommodates the variation of the input voltage or input current.

Likewise, when the detector detects the variation of the load, by varying the turn-on time of the first bridge and at the same time setting the turn-on time of the second bridge arm to be a fixed time period, the variation of gain accommodates the variation of the load.

For example, in FIG. 1, the input voltage Vin=about 54 V, the output voltage Vout is about 12 V, a resonance inductance Lr=about 10 μH, a parasitic inductance on the primary side Tr1 of the transformer Lm=about 100 μH, a resonance capacitance Cr=about 100 nH, a resonance frequency is about 159 kHz, and a variation of the transformer n=about 3. The output current Iout skips from about 10 A to about 5 A. If the DC/DC conversion apparatus is in the symmetric operation status when the output current Iout is about 10 A, a cycle time is about 3 μs, and the time in which Q1 and Q4 are commonly turned on is about 1 μs. When Iout skips to about 5 A, the output voltage will increase, the time in which Q2 and Q3 are commonly turned on (the turn-on time of the second bridge arm or the short-time bridge arm) may be directly set to about 200 ns according to a signal of the variation of Vout obtained by a negative feedback sampling system, and the time in which Q1 and Q4 are commonly turned on (the turn-on time of the first bridge arm or the long-time bridge arm) is still 1 μs. According to an amplitude of variation of Vout, the time in which Q2 and Q4 are commonly turned on increases. Since the time in which no energy is transmitted to the load through the transformer increases, the gain decreases, while a DC voltage appears due to asymmetry of the voltage on the resonance capacitor. At the time in which Q1 and Q4 are commonly turned on, the inputted energy is reduced and the gain decreases, and at the time in which Q2 and Q3 are commonly turned on, the inputted energy decreases and the gain decreases. This achieves the objective of fast response. After the output voltage is stabilized, the time in which Q1 and Q4 are commonly turned on increases slightly. Since the effect of the common turn-on of Q1 and Q4 on the gain are bidirectional, the gain will not vary dramatically, the output voltage will not vary dramatically, and the output ripple is controlled within an allowable range. When it is determined that the gain increases, a latency is added appropriately such that the gain decreases. In this manner, the operating frequencies decrease.

Figure 5:
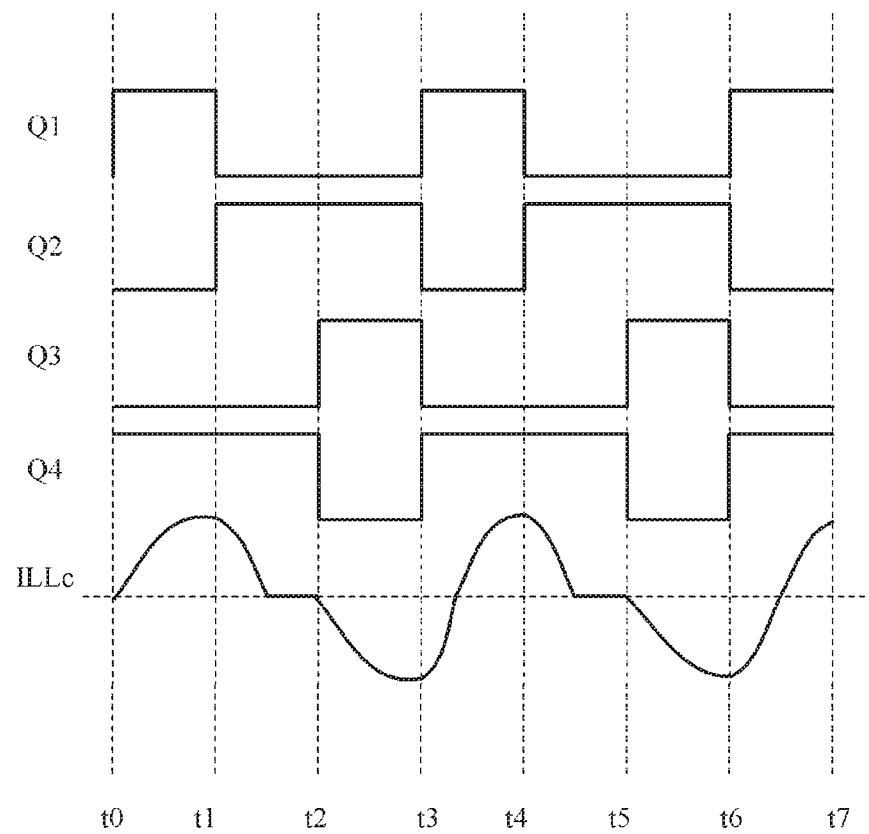
FIG. 5 shows a timing diagram of turn-on/turn-off of individual switch elements Q1~Q4 in a case in which a time of opening electrical connection between an oscillation circuit and a DC voltage source increases.
Figure 6:
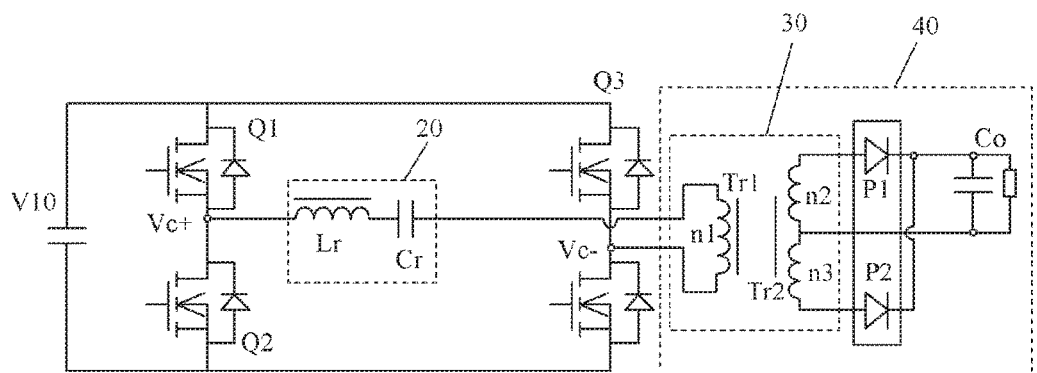
FIG. 6 is a block diagram illustrating a circuit structure of a DC/DC conversion apparatus 100 that includes a LLC full-bridge circuit in the prior art.
Figure 7:
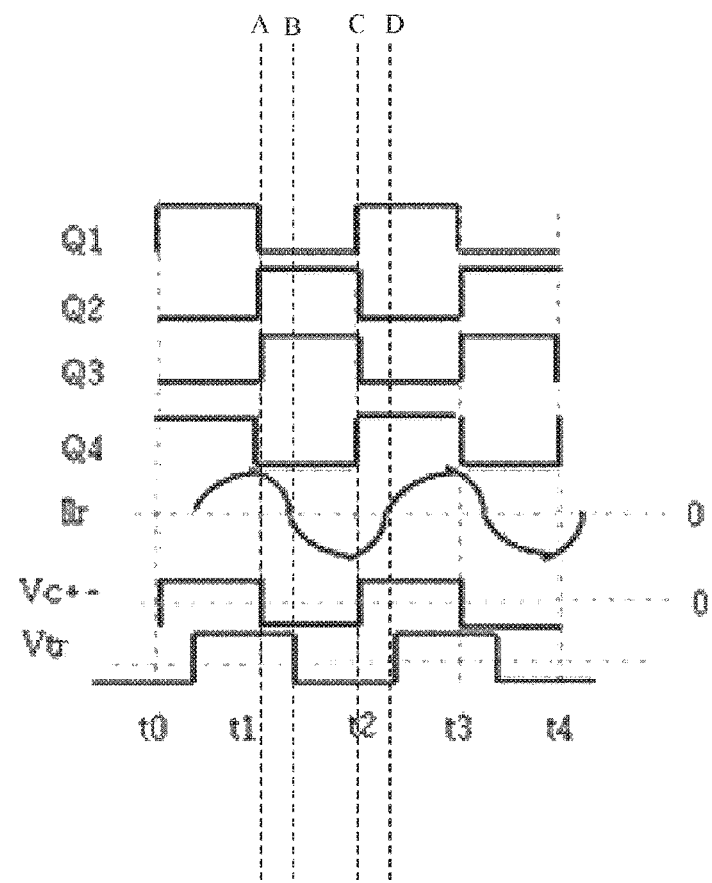
FIG. 7 is a diagram illustrating relationships between times at which individual switch elements Q1~Q4 are turned on/off, a current $I_{LLC}$ flowing through an oscillation circuit 20, and a voltage between a high potential side terminal Vc+ and a low potential side terminal Vc− of the oscillation circuit 20 in the prior art.
Figure 8:
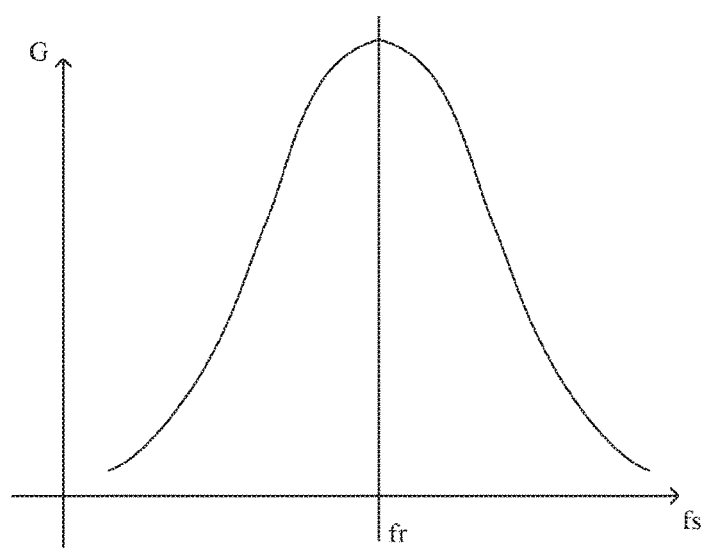
FIG. 8 is a diagram illustrating a relationship between a switching frequency and a gain of a DC/DC conversion apparatus that includes a LLC full-bridge circuit.

FIG. 5 shows a timing diagram of turn-on/turn-off of the individual switch elements Q1~Q4 when a time of opening the electrical connection between the oscillation circuit and the DC voltage source increases. After the current $I_{LLC}$ flowing through the oscillation circuit 2 becomes zero and after a latency Δh, the switch element Q2 and the switch element Q3 are turned on at the same time and the switch element Q1 and the switch element Q4 are turned off at the same time under the control of the switch controller 6, such that the voltage Vc+− applied on the oscillation circuit 2 instantly becomes a negative value.

In other words, a latency Δt is added after the current $I_{LLC}$ passing through the oscillation circuit 2 becomes zero. When other conditions are all invariable, since the total output energy remains constant, the gain of the DC/DC conversion apparatus decreases when the latency Δt is added.

As shown in FIGS. 1-3, when the load is a light load, since the output current needs to be reduced to avoid the load from being damaged, the operating frequencies are generally increased to decrease the gain so as to reduce the output current in the prior art. However, as the operating frequencies of the switch elements increase, various losses related to the frequencies (e.g., a loss of turning off the MOSFET switch each time), a turn-on loss due to skin effect, proximity effect, and other losses, a loss of a magnetic core and other circuit elements increase rapidly.

However, a latency Δt is added after the current $I_{LLC}$ flowing through the oscillation circuit 2 becomes zero. Within the latency Δt, although the switch elements Q2 and Q4 are turned on continuously, no energy is transmitted from the oscillation circuit 2 to the secondary side Tr2 via the primary side Tr1 of the transformer 3 at this moment. Therefore, no energy flows reversely from the oscillation circuit 2 to the DC voltage source V1 at this moment, such that the energy loss is avoided, and since the total output energy within one cycle remains constant and the total time of one cycle is expanded by adding a latency Δt, the gain can vary consecutively so as to adjust the output current to cope with the variation of the load.

In the above preferred embodiments of the present invention, when the DC/DC conversion apparatus is in the asymmetric operation status, a length of time of the first bridge arm is greater than a length of time of the second bridge arm.

When the switching frequency of the DC/DC conversion apparatus has no larger change, the shorter the length of time in which the second bridge arm is turned on is, the longer the length of time in which the first bridge arm is turned on, such that an adjustable range of the first bridge arm becomes larger. Thus, it is preferable that the time in which the second bridge arm is turned on is as short as possible.

However, if the time in which the second bridge arm is turned on is directly set to zero, for the switch Q1 and the switch Q3, a larger switching loss will be generated when the switches are turned on, i.e., a zero voltage switch (ZVS) cannot be achieved.

Thus, the length of time in which the second bridge arm is turned on is usually not less than a certain value, such that within this period of time, energy inputted to the resonance loop via the second bridge arm is greater than energy on the first bridge arm so as to achieve the zero voltage switch (ZVS).

The time in which the short-time bridge arm is turned on may be determined by the following formula [1]:

$$\frac{1}{2}C_{oss}V_{in}^2 <= \frac{1}{2}L_r * I_{Lr}^2 + \frac{1}{2}L_m * I_{Lm}^2 \quad [1]$$

Coss is the total capacitance value of the resonance loop. Vin is the power supply voltage, Lr is an inductance amount of the resonance inductor, ILr is the current of the resonance inductor, and ILm is the current of the parasitic inductance Lm on the primary side Tr1 of the transformer. The left side of the formula [1] is the energy inputted to the resonance loop via the second bridge arm and the right side thereof is the energy required to achieve the zero voltage switch (ZVS). Whether the above conditions are satisfied or not may be determined by detecting or estimating the current ILR of the resonance inductance and the current ILm of the parasitic inductance.

When the formula [1] is satisfied by the current ILR of the resonance inductance and the current ILm of the parasitic inductance, the switch element Q1 and the switch element Q4 are turned on at the same time and the switch element Q2 and the switch element Q3 are turned off at the same time. Thus, the electrical connection between the oscillation circuit 2 and the DC voltage source V1 is closed and the voltage Vc+− applied on the oscillation circuit 2 instantly becomes a positive value. At this moment, since a forward voltage Vc+− has been applied to the oscillation circuit 2, the current $I_{LLC}$ flowing through the oscillation circuit 2 increases forwardly from zero, i.e., becomes a positive value. The parasitic capacitance Cm1 of the switch element Q1 will be charged by the current $I_{LLC}$ flowing through the oscillation circuit 2 in a direction that is opposite to that of a voltage applied to the switch element Q1 when the switch element Q1 is turned on. Thus, when the switch element Q1 is turned on at time t3, the total voltage applied to two terminals of the switch element Q1 will decease such that a switching loss of the switch element Q1 when it is turned on is reduced. Furthermore, the total voltage applied to two terminals of the switch element Q1 can even be zero when the switch element Q1 is turned on, and the switching loss of the switch element Q1 when it is turned on can be zero at this moment, i.e., the switch element Q1 achieves a zero voltage switch (ZVS).

Second Preferred Embodiment

In a second preferred embodiment of the present invention, when the output voltage Vout varies dramatically, the process of commonly turning on the switches Q2 and Q3 may be removed.

For example, assume a stable output voltage Vout of the DC/DC conversion apparatus in the symmetric operation status is about 12 V, when the output voltage Vout suddenly increases to about 15 V, the DC/DC conversion apparatus may be directly switched from a full-bridge operation status to a half-bridge operation status. In other words, the switch element Q1 and the switch element Q4 are turned on at the same time and the switch element Q2 and the switch element Q3 are turned off at the same time under the control of the switch controller, such that the voltage of the oscillation circuit firstly is in the first direction, then the electrical connection between the oscillation circuit and the DC voltage source is opened, and next the direction of the voltage applied on the oscillation circuit returns to the first direction, so as to remove the process of commonly turning on the switches Q2 and Q3. When the DC/DC conversion apparatus is directly switched from the full-bridge operation status to the half-bridge operation status, the output gain thereof decreases such that the output voltage Vout is reduced to near about 12 V. Then the output voltage Vout is further adjusted to be stable at about 12 V by adjusting the frequency or time in which the switch element Q1 and the switch element Q4 are turned on at the same time.

Therefore, when the detector detects that a variation ratio of the output voltage or output current is greater than a threshold, the process of commonly turning on Q12 and Q3 is removed, and the loss resulting from turning on and off the two switches is avoided.

When the output is stabilized, the time in which Q2 and Q3 are commonly turned on decreases gradually, until the process of commonly turning on Q2 and Q3 is removed, such that the switching losses of Q2 and Q3 are avoided.

Various variations may be made to preferred embodiments of the present invention without departing from the wide spirit and scope of the present invention. In addition, the above preferred embodiments are only presented as examples of the present invention, but do not limit or restrict the scope of the present invention. In other words, the scope of the present invention is defined by the claims, but not defined by the above preferred embodiments. Moreover, various variations implemented within the scope of the claims and the scope of their equivalences may also be considered within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC/DC conversion apparatus, comprising:
 a DC voltage source that outputs a DC power supply voltage;
 an oscillation circuit electrically connected to the DC voltage source;
 a plurality of switch elements;

a switch controller that closes or opens an electrical connection between the DC voltage source and the oscillation circuit and switches a direction of a voltage applied to the oscillation circuit between a first direction and a second direction by switching turn-on and turn-off of the plurality of switch elements;

a transformation circuit that outputs a current generated in the oscillation circuit and converts the current into a DC current; and a detector that detects one or more parameter values of an input voltage and an input current of the DC voltage source and an output voltage and an output current to the transformation circuit; wherein when the one or more parameter values vary, the switch controller adjusts a length of time in which the voltage applied to the oscillation circuit is in one of the first direction and the second direction, such that the output voltage or the output current returns to an initial value; and during the voltage applied to the oscillation circuit in the second direction, energy is inputted from the DC voltage source to the oscillation circuit, a length of time in which the voltage applied to the oscillation circuit is in the second direction is set such that energy obtained from the DC voltage source is greater than energy required to achieve a zero voltage switch when the oscillation circuit is switched to the first direction.

2. The DC/DC conversion apparatus according to claim 1, wherein:

the switch controller opens the electrical connection between the oscillation circuit and the DC voltage source before the direction of the voltage applied to the oscillation circuit is switched from the first direction to the second direction, and then closes the electrical connection between the oscillation circuit and the DC voltage source, and switches the direction of the voltage applied on the oscillation circuit to the second direction; and when the output voltage or the output current to the transformation circuit vary, the switch controller adjusts a length of time in which the oscillation circuit is disconnected from the DC voltage source, such that the output voltage or output current returns to the initial value.

3. The DC/DC conversion apparatus according to claim 1, wherein:

the switch controller opens the electrical connection between the oscillation circuit and the DC voltage source before the direction of the voltage applied to the oscillation circuit is switched from the first direction to the second direction, then closes the electrical connection between the oscillation circuit and the DC voltage source and switches the direction of the voltage applied to the oscillation circuit to the second direction after a current flowing through the oscillation circuit has been outputted to the transformation circuit and after a specified latency;

when the output voltage or output current to the transformation circuit vary, the switch controller adjusts a length of the specified latency, such that the output voltage or output current returns to the initial value.

4. The DC/DC conversion apparatus according to claim 1, wherein a length of time in which the oscillation circuit is in the first direction is greater than a length of time in which the oscillation circuit is in the second direction.

5. The DC/DC conversion apparatus according to claim 4, wherein the switch controller adjusts the length of time in which the oscillation circuit is in the first direction.

6. The DC/DC conversion apparatus according to claim 4, wherein when a deviation of the output voltage or output current to the transformation circuit from the initial value is greater than a first threshold, the switch controller firstly adjusts a length of time in which the voltage applied to the oscillation circuit is in the first direction such that the output voltage or current changes to within one interval near a target voltage/current value, and then slightly adjusts the length of time in which the voltage applied to the oscillation circuit is in the first direction and a length of time in which the oscillation circuit is disconnected from the DC voltage source, such that the output voltage or current returns to the initial value.

7. The DC/DC conversion apparatus according to claim 4, wherein when a variation ratio of a deviation of the output voltage or output current to the transformation circuit from the initial value is greater than a second threshold, the switch controller firstly adjusts a length of time in which the voltage applied on the oscillation circuit is in the first direction such that the output voltage or current changes to within one interval near a target voltage/current value, and then slightly adjusts the length of time in which the voltage applied to the oscillation circuit is in the first direction and a length of time in which the oscillation circuit is disconnected from the DC voltage source such that the output voltage or current returns to the initial value.

8. The DC/DC conversion apparatus according to claim 1, wherein the plurality of switch elements include a first switch element, a second switch element, a third switch element, and a fourth switch element;

a connection point between the first switch element and the third switch element is connected to a positive side of the DC voltage source;

a connection point between the second switch element and the fourth switch element is connected to a negative side of the DC voltage source;

a connection point between the first switch element and the second switch element is connected to a first terminal of the oscillation circuit; and a connection point between the third switch element and the fourth switch element is connected to a second terminal of the oscillation circuit.

9. The DC/DC conversion apparatus according to claim 8, wherein:

when the first switch element and the fourth switch element are turned on and the second switch element and the third switch element are turned off, the voltage applied to the oscillation circuit is in the first direction; and when the first switch element and the fourth switch element are turned off and the second switch element and the third switch element are turned on, the voltage applied to the oscillation circuit is in the second direction.

10. The DC/DC conversion apparatus according to claim 1, wherein when a deviation of the output voltage or output current to the transformation circuit from the initial value is greater than a third threshold, the switch controller firstly allows the voltage of the oscillation circuit to be in the first direction, then opens the electrical connection between the oscillation circuit and the DC voltage source, and next allows the direction of the voltage applied on the oscillation circuit to return to the first direction.

11. The DC/DC conversion apparatus according to claim 1, wherein the transformation circuit includes transformer, at least one rectification diode, and an output capacitor.

12. The DC/DC conversion apparatus according to claim 11, wherein the at least one rectification diode includes a first rectification diode and a second rectification diode, the transformer includes a primary side and a secondary side, the primary side includes a first coil, the secondary side includes a second coil and a third coil, an anode of the first rectification diode is connected at one terminal of the third coil and a cathode of the first rectification diode is connected to another terminal of the third coil via the output capacitor, an anode of the second rectification diode is connected to one terminal of the second coil and a cathode of the second rectification diode is connected to the cathode of the first rectification diode.

13. The DC/DC conversion apparatus according to claim 12, wherein the primary side of the transformer is connected in series with the oscillation circuit.

14. The DC/DC conversion apparatus according to claim 1, wherein the oscillation circuit includes an inductor and a capacitor.

15. The DC/DC conversion apparatus according to claim 1, wherein each of the plurality of switches is a MOSFET.

* * * * *